(12) United States Patent
Rosthal

(10) Patent No.: US 6,937,021 B2
(45) Date of Patent: Aug. 30, 2005

(54) METHOD AND APPARATUS FOR DETERMINING THE PRESENCE AND ORIENTATION OF A FRACTION IN AN EARTH FORMATION

(75) Inventor: Richard A. Rosthal, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/314,795

(22) Filed: Dec. 9, 2002

(65) Prior Publication Data

US 2004/0108853 A1 Jun. 10, 2004

(51) Int. Cl.⁷ .................................................. G01V 3/28
(52) U.S. Cl. ...................................... 324/339; 324/343
(58) Field of Search ........................ 324/333, 337–343; 702/6–14

(56) References Cited

U.S. PATENT DOCUMENTS

| | | | | |
|---|---|---|---|---|
| 4,264,862 A | * | 4/1981 | Koelle et al. | 324/339 |
| 4,360,777 A | * | 11/1982 | Segesman | 324/339 |
| 4,446,433 A | * | 5/1984 | Shuck | 324/338 |
| 6,044,325 A | * | 3/2000 | Chakravarthy et al. | 702/7 |
| 6,181,138 B1 | * | 1/2001 | Hagiwara et al. | 324/338 |
| 6,191,586 B1 | * | 2/2001 | Bittar | 324/339 |
| 6,541,975 B2 | * | 4/2003 | Strack | 324/323 |
| 2003/0076107 A1 | * | 4/2003 | Fanini et al. | 324/339 |
| 2004/0001388 A1 | * | 1/2004 | Kriegshauser et al. | 367/21 |

FOREIGN PATENT DOCUMENTS

| | | |
|---|---|---|
| GB | 2066475 | 7/1981 |
| GB | 2221309 | 1/1990 |
| GB | 2279149 | 12/1994 |
| WO | WO03/054587 | 7/2003 |

OTHER PUBLICATIONS

Sool et al., "The potential of fracture imaging using high-frequency, single-hole electromagnetic data," Geophysics, vol. 67, No. 4, Jul./Aug. 2002, p. 1087–1094.*

* cited by examiner

Primary Examiner—Jay Patidar
Assistant Examiner—Reena Aurora
(74) Attorney, Agent, or Firm—Victor H. Segura; Kevin P. McEnaney; Dale Gaudier

(57) ABSTRACT

The invention relates to a system and methods for locating a fracture in an earth formation. A method for detecting a fracture in an earth formation using an induction tool includes inducing electromagnetic fields using a set of transmitters on the induction tool. A plurality of the transmitters being arranged such that their magnetic moments are transverse or tilted with respect to the tool axis. Voltages induced in a set of receivers on the induction tool are measured, the voltages being induced by eddy currents that result from the electromagnetic fields. A plurality of receivers being arranged such that their axes are transverse or tilted with respect to the tool axis. The transmitters and receivers are spaced apart along the tool axis. The presence of the fracture is determined based on the measured voltages.

31 Claims, 4 Drawing Sheets

METHOD AND APPARATUS FOR DETERMINING THE PRESENCE AND ORIENTATION OF A FRACTION IN AN EARTH FORMATION

BACKGROUND OF INVENTION

1. Field of the Invention

This invention relates to the field of subsurface exploration and, more particularly, to logging techniques for detecting and locating fractures in earth formations.

2. Description of Related Art

Electromagnetic (EM) logging tools have been employed in the field of subsurface exploration for many years. These logging tools or instruments entail an elongated support equipped with antennas that are operable as sources or sensors. The antennas on these tools are generally formed as loops or coils of conductive wire. In operation, a transmitter antenna is energized by an alternating current to emit EM energy through the borehole fluid ("mud") and into the surrounding formations. The emitted energy interacts with the borehole and formation to produce signals that are detected and measured by one or more receiver antennas. The detected signals reflect the interaction with the mud and the formation. By processing the detected signal data, a profile of the formation and/or borehole properties is determined.

In conventional EM logging tools, the transmitter and receiver antennas are typically mounted with their axes along, or parallel to, the longitudinal axis of the tool. Thus these instruments are implemented with antennas having longitudinal magnetic dipoles (LMD). An emerging technique in the field of well logging is the use of tools with tilted or transverse antennas, i.e., where the antenna's axis is not parallel to the support axis. These tools are thus implemented with antennas having a transverse or tilted magnetic dipole moment (TMD). The aim of these TMD configurations is to provide EM measurements with directed sensitivity and also sensitivity to the entire conductivity sensor. Logging tools equipped with TMDs are described in U.S. Pat. Nos. 6,044,325, 4,319,191, 5,115,198, 5,508,616, 5,757,191, 5,781,436 and 6,147,496.

A coil or loop-type antenna carrying a current can be approximated as a magnetic dipole having a magnetic moment proportional to the product of the current and the area encompassed by the coil. The direction and strength of the magnetic moment can be represented by a vector perpendicular to the plane of the coil. In the case of more complicated coils, which do not lie in a single plane (e.g. saddle coils as described in published U.S. Patent Application No. 20010004212 A1, published Jun. 21, 2001), the direction of the dipole moment is given by: $\oint r \times dl$ and is perpendicular to the effective area of the coil. This integral relates to the standard definition of a magnetic dipole of a circuit. See J. A. Stratton, ELECTROMAGNETIC THEORY, McGraw Hill, New York, 1941, p. 235, FIG. 41. Integration is over the contour that defines the coil, r is the position vector and dl is the differential segment of the contour.

Identification of subsurface fractures is important in oil well exploration and production. Fractures are cracks or breakages within the rocks or formations. Fractures can enhance permeability of rocks or earth formations by connecting pores in the formations. Fractures may be filled with formation fluids, either brine or hydrocarbons. If a fracture is filled with hydrocarbons, it will be less conductive, i.e., a resistive fracture. Deviated wells drilled perpendicularly to resistive fractures tend to be more "productive" (i.e., produce lager quantities of hydrocarbons). Thus, determination of orientations of resistive fractures may help improve gas and oil production. Fractures may be either natural or induced. Natural fractures are those present before the well is drilled, while induced fractures are produced by the drilling process itself. The orientation of a fracture provides the direction of principal stress that affects the stability of the well and it helps in predicting which well trajectory will be the most stable. Knowledge of the presence of and orientation of induced aids in the prediction of fracture strengths of the earth formation. Furthermore, the presence of induced fractures may indicate that the mud weight used for drilling the well is too high so as to cause failure of the rock.

Many methods and systems have been developed for detecting fractures and determining their orientation. For example, U.S. Pat. No. 3,668,619 describes rotating logging tool having a single acoustic transducer that senses the reflected acoustic energy to detect fractures, U.S. Pat. No. 5,121,363 describes a method for locating a subsurface fracture based on an orbital vibrator equipped with two orthogonal motion sensors and an orientation detector. U.S. Pat. No. 4,802,144 uses the measurement of hydraulic impedance to determine fractures. U.S. Pat. No. 2,244,484 measures downhole impedance to locate fractures by determining propagation velocity. Dipole Sonic took are often used to provide fracture orientation, since the presence of fractures produces a velocity difference between soundwaves polarized parallel to the fractures and those polarized perpendicular to them.

There remains a need for improved techniques for detecting and locating fractures, particularly resistive fractures, and for determining their orientations.

SUMMARY OF INVENTION

The invention provides a method for detecting a fracture in an earth formation using an induction tool, the tool having a longitudinal axis. The method includes inducing electromagnetic fields using a set of transmitter antennas disposed on the induction tool, a plurality of the transmitter antennas being arranged with their magnetic moments at an angle with respect to the tool axis and oriented in different directions from one another; measuring voltages induced in a set of receiver antennas disposed on the induction tool, the voltages being induced by eddy currents that result from the electromagnetic fields, a plurality of the receiver antennas being arranged with their axes at an angle with respect to the tool axis and oriented in different directions from one another; and determining the presence of the fracture based on the measured voltages.

The invention provides a system for locating a subsurface fracture in an earth formation. The system includes an induction tool having a longitudinal axis and adapted for disposal within a borehole traversing the formation; a set of transmitter antennas disposed on the tool, a plurality of the antennas arranged with their magnetic moments at an angle with respect to the tool axis and oriented in different directions from one another; a set of receiver antenna disposed on the tool and adapted to detect eddy currents induced by the transmitter antennas, a plurality of the receiver antennas arranged with their axes at an angle with respect to the tool axis and oriented in different directions from one another; a power source to energize the set of transmitter antennas; processing means to determine voltages induced in the set of receiver antennas; and processing means to locate a fracture from the voltages induced in the receiver antennas.

The invention provides a method for locating a fracture in an earth formation penetrated by a borehole. The method includes moving an induction tool in the borehole, the induction tool having a longitudinal axis and comprising a plurality of transmitter antennas adapted to induce mutually orthogonal magnetic moments and a plurality of receiver antennas having mutually orthogonal axes; inducing magnetic fields using the plurality of transmitter antennas; measuring voltages induced in the plurality of receiver antennas; and locating the fracture from the voltages induced in the plurality of receiver antennas.

DETAILED DESCRIPTION

Figure 1:
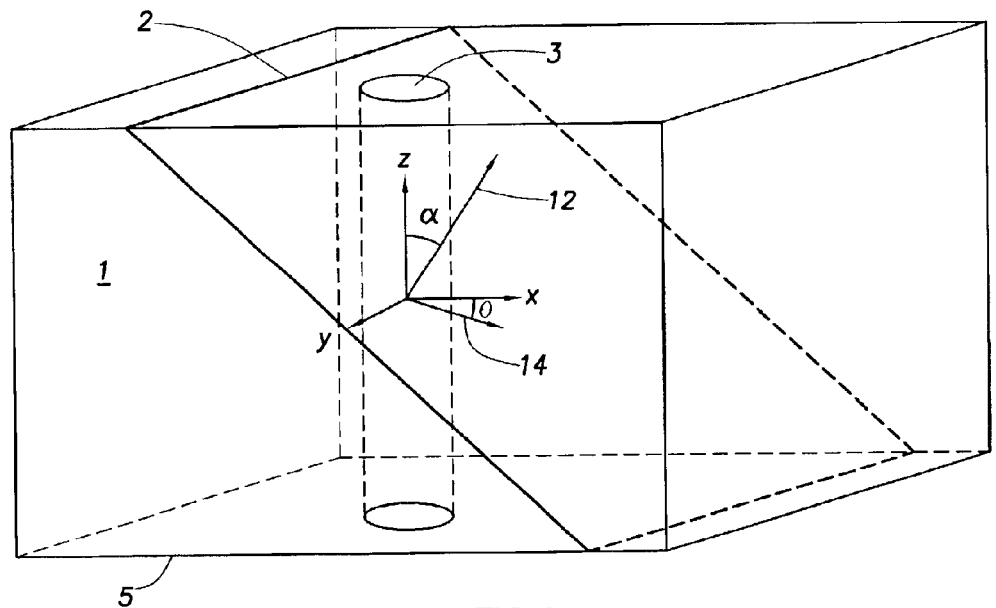
FIG. 1 is perspective view of an earth formation having a fracture and penetrated by a borehole.

Embodiments of the invention relate to methods and apparatus for detecting fractures in earth formations. Methods of the invention are based on responses of EM induction tools.

Induction tools measure the resistivity (or conductivity) of the formation by measuring the voltage induced in the receiver antenna as a result of magnetic flux induced by currents flowing through the emitting (or transmitter) antenna. Modern induction tools have many transmitter and receiver coils. However, the principle can be understood by considering a hypothetical induction tool having only one transmitter coil and one receiver coil aligned in the longitudinal direction (the direction of tool axis). A radio-frequency alternating current of constant intensity is sent through the transmitter coil. Typical frequencies are approximately in the range 10 kHz–200 kHz. The alternating magnetic field created in the transmitter coil induces currents (eddy currents) in the formation surrounding the borehole. In an axisymmetric formation these currents flow in circular ground loops coaxial with the transmitter coil and create, in turn, a magnetic field that induces a voltage in the receiver coil aligned with the axis of transmitter coil.

Because the alternating current in the transmitter coil is of nearly constant frequency and amplitude, the magnitudes of the ground loop currents are directly proportional to the formation conductivity, at least in a low conductivity formation. In modern tools, variations in the transmitter intensity are compensated for by measuring the transmitter intensity and forming the transimpedence, which is the ratio of received voltage divided by transmitter current. The voltage induced in the receiver coils is proportional to the magnitudes of the ground loop currents and, therefore, to the conductivity of the formation.

However, because the currents flow in circular loops coaxial with the transmitter coil, if a receiver coil is disposed in a plane perpendicular to the axis of the transmitter coil, the eddy currents will not induce any voltage in this receiver. Thus, in the absence of interference from the formation (e.g., in a homogeneous formation), only the receiver disposed in the same orientation as that of the transmitter would record a voltage. A modern induction tool typically has multiple transmitters and multiple receivers paired up in various orientations. For example, in a triaxial induction tool, there are three transmitter coil-receiver coil pairs arranged such that their magnetic moments/axes are not co-planar. The receiver coils are generally disposed at a distance from the transmitter coils. While the orientations of the receiver coils in a conventional induction tool typically coincide with those of the transmitter coils, one skilled in the art would appreciate that one or more receiver coils may be arranged on same (or substantially similar) orthogonal axes but point to opposite directions (180° flip) with respect to the corresponding transmitter coils. In this case, the receiver coils will register the same magnitudes of voltages but opposite signs. U.S. Pat. Nos. 5,157,605, 3,340,464, 3,147,429, and 4,472,684 are illustrative of typical well logging tools that utilize the basic principles of induction logging.

The above description of current flows in the ground loops assumes that the formation is isotropic in the plane perpendicular to the tool axis (isotropic or TI anisotropy). If this assumption is not satisfied then the current flows will be distorted.

Several conventional tools are available for investigating anisotropic or inhomogeneous formations or formation boundaries. For example, U.S. Pat. No. 5,530,359 (assigned to the present assignee) discloses a logging tool with multiple transmitter and receiver antennae for detecting locations of formation boundaries. U.S. Pat. No. 6,147,496 discloses an induction tool for investigating laminated formation layers. U.S. Pat. No. 6,181,138 B1 discloses a logging tool having skewed antennas for directional resistivity measurements for azimuthal proximity detection of bed boundaries.

While induction tools have been used to detect formation layering, i.e., dips and boundaries, these tools have not been used to detect fractures except where combined with other tools. Compared with a formation layer, a formation fracture is very thin. A fracture may have a different inductive/resistive property from the surrounding formation. In addition, fractures often cut across formation layers. Thus, a fracture creates a boundary/discontinuity in an otherwise continuous layer. If the fracture is filled with hydrocarbons, which are non-conductive, the fracture acts like an insulating layer and is expected to have a dramatic impact on the measured conductivity.

Embodiments of the invention are applicable to various fractures, but are most applicable when the fracture has low conductivity, i.e., oil-filled fractures. A low conductivity fracture distorts, reduces, or interrupts the eddy currents and, therefore, affects the voltages detected by induction tools. The magnitudes of these effects depend on the distance of the fracture to the tool and its orientation relative to the tool. For induced fractures, which intercept the borehole, the depth of the fracture can have a dramatic effect on the size of the response.

FIG. 1 shows a planar fracture 2 embedded diagonally in an earth formation 1. A borehole 3 penetrates the earth formation 1 perpendicularly to the horizontal plane 5 of the earth formation 1. The fracture's orientation is defined by the normal 12 to the fracture's plane. The fracture's normal 12 makes an angle ($\alpha$) with the longitudinal z axis of the borehole 3. Projection 14 of the fracture's normal 12 onto a plane parallel to the earth formation's horizontal plane 5 is at an angle ($\theta$) with respect to the x axis.

As noted above, oil-filled fractures have dramatic effects on induction measurements. Therefore, an induction tool with an ability to detect induction responses in specific orientations (e.g., a triaxial induction tool having a triaxial transmitter and a triaxial receiver) can detect the presence of fractures and their orientation. Methods of the invention are applicable to any induction tool capable of directional sensing. While this description uses a triaxial induction tool to illustrate methods of the invention, one skilled in the art would appreciate that other suitable tools (e.g., those having only transverse transmitters and receivers) may be used.

Figure 2:
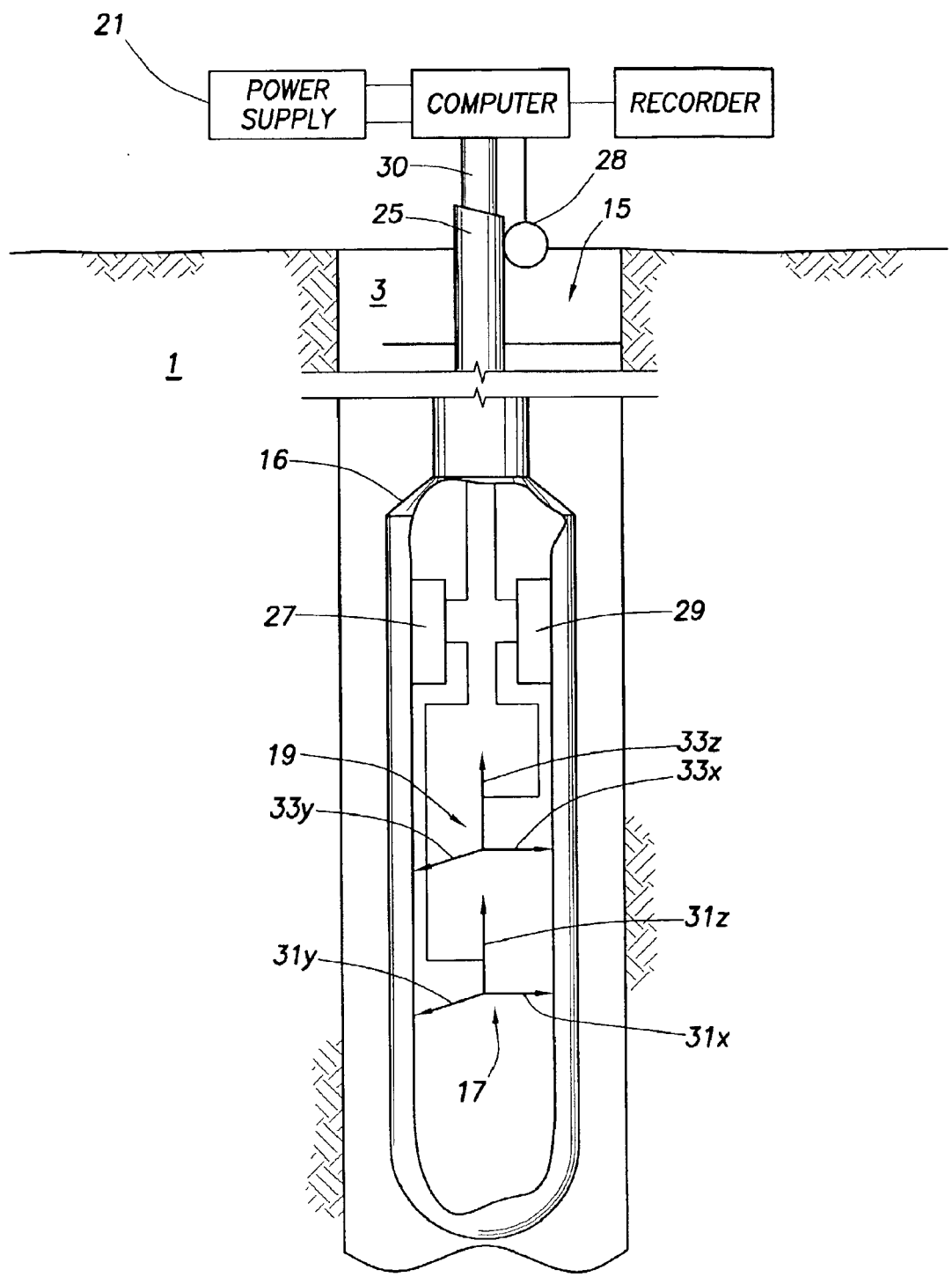
FIG. 2 shows a prior art triaxial logging tool suitable for practicing embodiments of the invention disposed in a borehole.

FIG. 2 shows a downhole logging tool 15, which includes an induction tool 16 having a triaxial transmitter 19 and a triaxial receiver 17, disposed in a borehole 3 that penetrates a formation 1. The triaxial receiver 17 is arranged such that its axes ($31_x$, $31_y$, and $31_z$) are substantially parallel with the magnetic moments ($33_x$, $33_y$, and $33_z$) of the triaxial transmitter 19. The transmitter's magnetic dipole moments and the receiver's axes are shown as arrows for ease of illustration. The induction tool 16 is shown supported in the borehole 3 by a logging cable 25 in the case of a wireline system or a drill string 25 in the case of a logging-while-drilling (LWD) system. With a wireline tool, the induction tool 16 is raised and lowered in the borehole 3 by a winch 28, which is controlled by the surface equipment 21. Logging cable or drill string 25 includes conductors 30 that connect the downhole electronics with the surface equipment 21. Downhole electronics comprise a transmitter circuit 27 and a receiver circuit 29. The transmitter circuit 27 controls current flows through the transmitter coils ($31_x$, $31_y$, $31_z$) to generate magnetic moments $M_x$, $M_y$, and $M_z$ (not shown). The magnetic moments in turn induce eddy currents that flow in the earth formation 1 surrounding the borehole 3. The eddy currents induce secondary magnetic fields. The receiver circuit 29 detects voltages in the receiver coils ($33_x$, $33_y$, $33_z$) that are induced by the secondary magnetic fields. The detected signals are communicated to the surface equipment 21 for processing. Alternatively, these signals may be processed in the induction tool 16, and the processed data are then transmitted to the surface. In some embodiments, the induction tool 16 may include a motor (not shown) to rotate the triaxial transmitter and the triaxial receiver in the azimuthal direction. In another embodiment of the invention, the transmitter or receiver could consist of multiple sensors that are not perpendicular to each other, so long as together they form a complete orthogonal set (not shown). Another embodiment may have transmitter antennas and receiver antennas that are not parallel to each other (not shown).

The surface equipment 21 may be adapted to process the received voltages as a function of depths and azimuthal angles of the induction tool 16. The voltages in the receiver coils ($33_x$, $33_y$, and $33_z$) of the induction tool 16 can be shown as vector voltages, the magnitudes and phases of which depend on the conductivity of the surrounding earth formation 1. The received voltage is a complex signal, i.e., part of it is in phase with the transmitter current and part of it is phase shifted relative to the phase of the transmitter current. The part of the receiver signal that is in phase with the transmitter current is referred to as the R-signal, while the part that is out of phase with respect to the transmitter current is referred to as the X-signal.

In an axisymmetric formation, the magnetic moments $M_x$, $M_y$, and $M_z$ produced by the triaxial transmitter 19 only induce voltages in the corresponding receivers in the same orientations. That is, when the transmitter in the X axis is energized, only the receiver aligned in the X direction detects a nonzero voltage. This is indicated as $V_{xx}$. Similarly, when the Y transmitter is energized, only the Y receive detects a nonzero voltage, $V_{yy}$, and the same is true for the transmitter-receiver pair in the Z direction, $V_{zz}$. This relationship can be represented with the following tensor:

$$\begin{array}{cccc} & X & Y & Z \\ X & \begin{pmatrix} V_{xx} & 0 & 0 \\ Y & 0 & V_{yy} & 0 \\ Z & 0 & 0 & V_{zz} \end{pmatrix} & & \end{array} \quad (1)$$

If the transmitter or receiver coils are not orthogonal, this relationship can be derived by appropriate coordinate transformation of the measured couplings.

Figure 3:
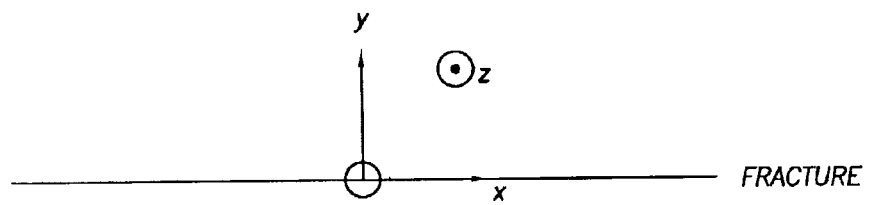
FIG. 3 is a schematic showing a tool disposed in a borehole with one transmitter-receiver pair oriented with its magnetic moment on the plane of a facture.

FIG. 3 illustrates a simple scenario in which the plane of the fracture coincides with a plane defined by two receiver axes (e.g., X-Z). If the fracture is filled with a fluid with a lower conductivity (e.g., an oil-filled fracture) than the formation, then the loop currents induced by the Y transmitter, which flow in planes parallel the fracture plane, would not be significantly affected by the presence of the fracture. Consequently, the coupling between the transmitter and receiver in the Y direction is substantially unaffected. Thus, the detected $V_{yy}$ is not substantially affected by the fracture. In contrast, the currents induced by the X or Z transmitters flow in planes perpendicular to the fracture plane and the current loops need to flow through the resistive fracture. As a result, the detected $V_{xx}$ and $V_{zz}$ voltages will be measurably reduced. However, the cross term voltages (i.e., $V_{xy}$, $V_{yx}$, $V_{xz}$, $V_{zx}$, $V_{yz}$, and $V_{zy}$) remain zero in this scenario because the presence of the fracture only affects the magnitudes of the eddy currents but does not skew the current loops. In this case, the detected voltages may be represented by a matrix similar to that of matrix (1) except that the voltages of $V_{xx}$ and $V_{zz}$ are reduced.

Figure 4:
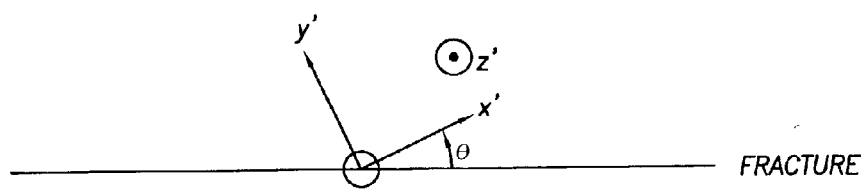
FIG. 4 is a schematic showing a tool disposed in a borehole with one transmitter-receiver pair oriented with its magnetic moment away from the plane of a fracture by an angle θ.

FIG. 4 illustrates a scenario in which the plane of the fracture parallels the Z' axis of the transmitter or receiver, but makes an angle ($\theta$) with respect to the X' axis of the transmitter and receiver. This scenario occurs when a tool is rotated by an angle ($\theta$) from the situation illustrated in FIG. 3. In this second scenario, neither the X' nor the Y' axis of the tool is aligned with the fracture plane. As a result, the eddy currents produced by the X' or Y' transmitter will be "distorted" by the presence of the low conductive fracture. Consequently, the cross terms ($V_{xy}$, $V_{yx}$) will not be zero. The magnitudes of these cross terms depend on the angle ($\theta$). All voltages detected in this case can be represented in the following matrix:

$$\begin{array}{cccc} & X' & Y' & Z' \\ X' & \begin{pmatrix} V_{xx}\cos^2(\theta) + V_{yy}\sin^2(\theta) & (V_{yy} - V_{xx})\cos(\theta)\sin(\theta) & 0 \\ Y' & (V_{yy} - V_{xx})\cos(\theta)\sin(\theta) & V_{xx}\sin^2(\theta) + V_{yy}\cos^2(\theta) & 0 \\ Z' & 0 & 0 & V_{zz} \end{pmatrix} & & \end{array} \quad (2)$$

where $V_{xx}$, $V_{yy}$, and $V_{zz}$ represent the voltages that would have been detected if the fracture plane is aligned with the X axis of the receiver, i.e., θ=0 degree, as shown in FIG. 3. This relationship applies when the configurations for all the measurements are generally the same. If the different measurements (for instance xx and xy) are made with different configurations, i.e. different spacings, then the relationship between measurements with a rotated tool and those made with a tool aligned with the fracture becomes more complex and their solution may involve the, use of a more complex modeling code (e.g. a three-dimensional modeling code).

From the above matrix (2), it is possible to determine the direction of the fracture. One approach is to solve the simultaneous equations for $V_{xx}$, $V_{yy}$, and θ. In a simplified approach, the simultaneous equations represented by matrix (2) can be rearranged to give:

$$\theta = \tfrac{1}{2} \tan^{-1}(2V'_{xy}/(V'_{yy}-V'_{xx})) \quad (3)$$

$$V_{yy}-V_{xx} = 2\,V'_{xy}/\sin(2\theta) \quad (4)$$

$$V_{xx}+V_{yy} = V'_{xx}+V'_{yy} \quad (5)$$

Equations (4) and (5) can be further rearranged to give:

$$V_{xx} = \tfrac{1}{2}(V'_{xx}+V'_{yy}-2\,V'_{xy}/\sin(2\theta)) \quad (6)$$

$$V_{yy} = \tfrac{1}{2}(V'_{xx}+V'_{yy}+2\,V'_{xy}/\sin(2\theta)) \quad (7)$$

Equations (3), (6), and (7) indicate that irrespective of the orientation of the tool, it is possible to determine the orientation (θ) of the fracture as well as the $V_{xx}$ and $V_{yy}$ voltages. These are obtainable by measuring the direct (xx and yy) couplings as well as the indirect (xy and yx) couplings, preferably with tools having the same configuration.

These equations show only one possible way to analyze the data. In general all the needed measurements ($V_{xx}$, $V_{xy}$, $V_{yx}$ and $V_{yy}$) should be obtained with the same tool configuration. While equation (2) is exact for a perfect situation, in a real well there will be factors that cause it to be inexact. These might include electronic noise, borehole effect, or more complicated heterogeneities in the formation. One might, for instance, want to obtain the fracture orientation that minimized the least squares error in equation (2). Those skilled in the art will recognize many other optimization approaches that might be used to implement the invention.

The above equations also show that if a tool is rotated as in a logging-while-drilling (LWD) tool, a series of $V_{xx}$, $V_{yy}$, and $V_{xy}$ voltages can be obtained as a function of azimuthal angles. The detected $V_{xx}$, $V_{yy}$, and $V_{xy}$ voltages will have sinusoidal modulations with respect to θ.

Figure 5:
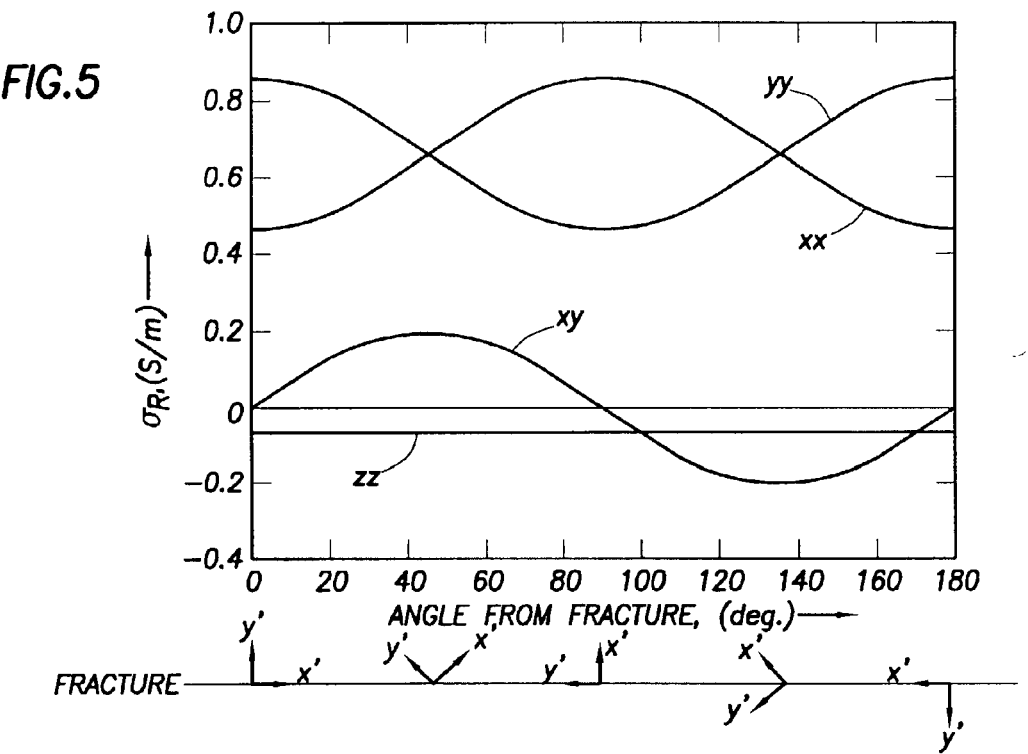
FIG. 5 shows the real components of the induced voltage as a function of tool rotation angles detected with various transmitter-detector coils in an induction tool.
Figure 6:
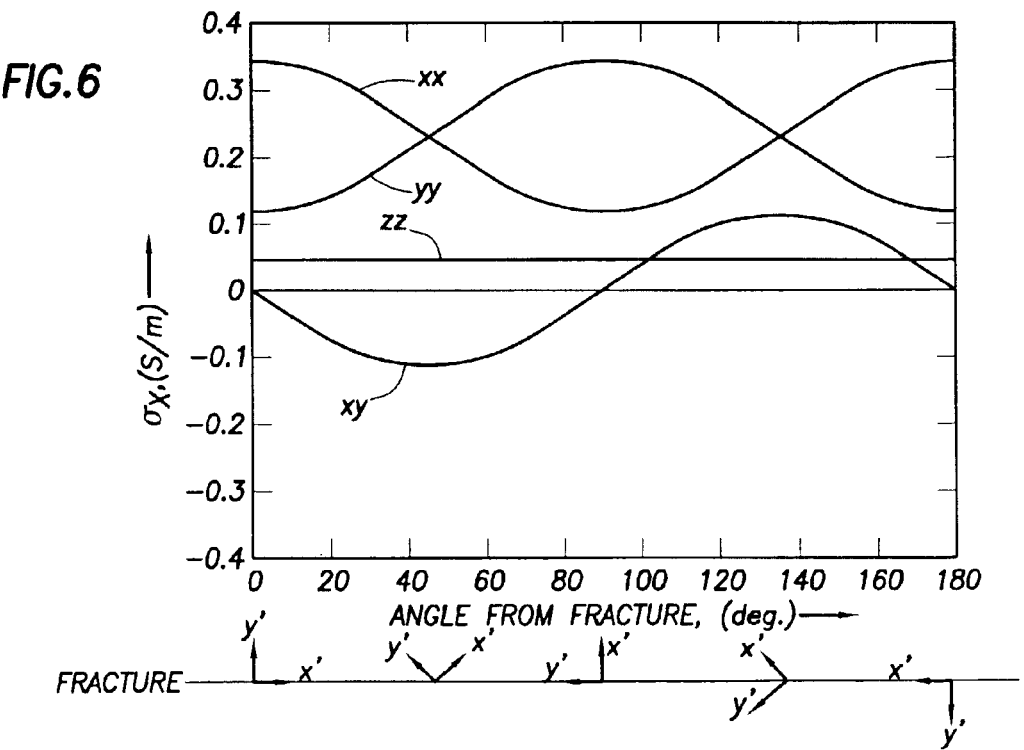
FIG. 6 shows the imaginary components of the induced voltage as a function of tool rotation angles detected with various transmitter-detector coils in an induction tool.

FIGS. 5 and 6 show the R-signal and X-signal responses, respectively, to a resistive fracture in a 1 Ω-m formation as a function of orientation of the tool, i.e., the angle θ. These measurements were obtained using a triaxial induction tool having receivers disposed at 39 inches (99 cm) and 27 inches (68.6 cm) away from the transmitter. The results shown in FIGS. 5 and 6 were obtained with the tool operated at a frequency of 26 kHz.

As shown in FIG. 5, the presence of a resistive fracture is evident from $V_{zz}$ measurement, which can also be obtained with a conventional induction tool having both the transmitter and receiver arranged in the longitudinal axis (i.e., the tool axis). As shown in FIG. 5, $V_{zz}$ is slightly negative, which may be used to indicate the presence of a resistive fracture. However, voltage measurement $V_{zz}$ cannot provide orientation of the fracture because there is no angular dependence.

As noted above, if either the X or Y axis of the tool is aligned with the fracture plane (see FIG. 3), there is no voltage in the cross terms, $V_{xy}$ or $V_{yx}$. This is validated in FIGS. 5 and 6, which show that at θ=0° or 90°, $V_{xy}$=0. Note that when θ=0–45° and 135–180°, the R-signal $V_{xx}<V_{yy}$ and the X-signal $V_{xx}>V_{yy}$. When θ=45–135°, the R-signal $V_{xx}>V_{yy}$ and the X-signal $V_{xx}<V_{yy}$. Thus, even in the absence of the cross term, it is possible to determine the quadrant in which the fracture lies by comparing the relative magnitudes of $V_{xx}$ and $V_{yy}$ voltages from either the R-signal and/or the X-signal. A more exact determination of the fracture orientation is possible if the cross-terms are also measured.

When θ=45° or 135°, $V_{xx}=V_{yy}$ in both the R-signal and the X-signal. The cross term $V_{xy}$ is measured in order to resolve the ambiguity. As shown in FIGS. 5 and 6, when θ=45°, $V_{xy}$ is positive in the R-signal, but negative in the X-signal. On the other hand, when θ=135°, $V_{xy}$ is negative in the R-signal, but positive in the X-signal. Thus, the relative signs of the $V_{xy}$ cross term can be used to resolve the ambiguity of the fracture orientation at 45° and 135°. Note that the measurements that are sufficient for determining the presence and orientation of a fracture consist of $V_{xx}$, $V_{yy}$, and $V_{xy}$. Thus, a tool having only two transmitters and two receivers aligned in the transverse direction and at right angle to each other would be sufficient for these measurements. That is, there is no need to have the transmitter and receiver in the Z direction (longitudinal direction).

FIGS. 5 and 6 show sinusoidal curves of the voltage measurements as a function of tool rotation angles relative to the fracture plane. Such measurements can be obtained with an LWD tool. Having these measurement curves, the orientation of the fracture plane can be derived. However, as noted above, even if only measurements at a single azimuthal angle are obtained (e.g., using a wireline tool), it is still possible to derive the fracture orientation based on relative magnitudes and signs of the various R-signal and X-signal measurements, i.e., $V_{xx}$, $V_{yy}$, $V_{xy}$, and $V_{zz}$.

Figure 7B:
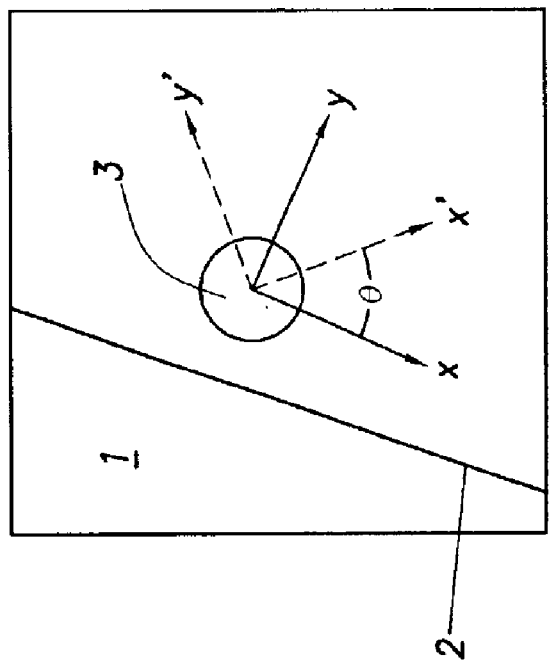
FIG. 7B shows a top view of the formation in FIG. 7A.
Figure 7A:
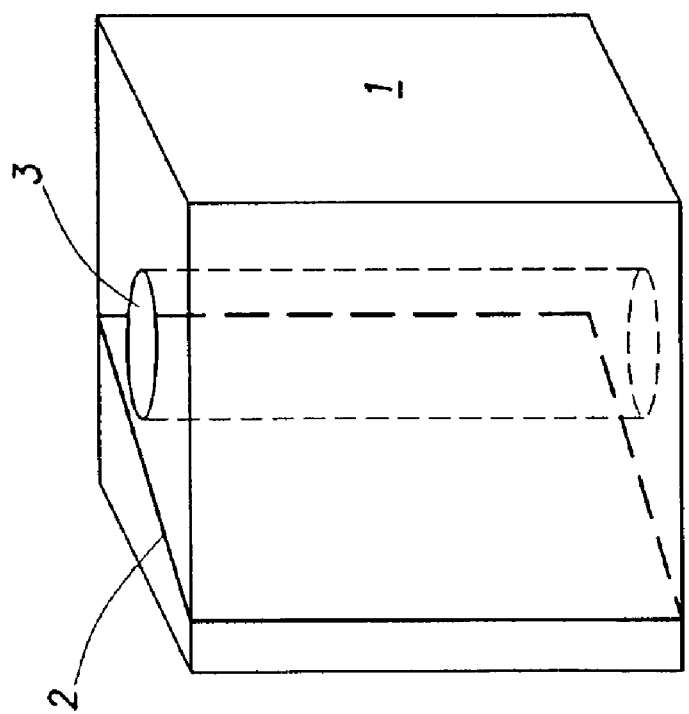
FIG. 7A shows a perspective view of a formation having a borehole and a fracture disposed at a distance from the borehole.

For simplicity, the above analysis is shown with the plane of the fracture cutting through the borehole. A similar result is obtained if the plane of the fracture parallels the Z axis but is disposed at a distance from the borehole as shown in FIGS. 7A and 7B. FIG. 7A shows a perspective view of a fracture 2 cutting through an earth formation 1 such that the longitudinal axis of the borehole 3 parallels the fracture plane. FIG. 7B shows a top view of the fracture 2 and the borehole 3 shown in FIG. 7A.

In this case, the angular dependence of the cross term voltages, $V_{xy}$ and $V_{yx}$, remains the same. However, the magnitudes of angular modulations on various terms, $V_{xx}$, $V_{yy}$, $V_{zz}$, $V_{xy}$ and $V_{yx}$, will be smaller because the effects of the fracture are more remote. In fact, the magnitudes of angular modulations in such measurements may be used to predict the distance between the fracture plane and the borehole. If several such measurements are obtained as a function of axial depth, the distances between the fracture plane and the borehole at various axial depths may be used to determine the tilt of the fracture plane relative to the Z axis.

It will be apparent to those skilled in the art that this invention may be implemented by programming one or more suitable general-purpose computers having appropriate hardware. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus these processing means may be implemented in the surface equipment 21, in the tool 16, or shared by the two as known in the art.

Advantages of the present invention include convenient methods for detecting the presence and orientation of formation fractures. The techniques of the invention may be used with a wireline tool or an LWD/MWD tool. For the purposes of this specification it will be clearly understood that the word "comprising" means "including but not limited to", and that the word "comprises" has a corresponding meaning.

What is claimed is:

1. A method for detecting a fracture in an earth formation using an induction tool, the tool having a longitudinal axis, comprising:

(a) inducing electromagnetic fields using a set of transmitter antennas disposed on the induction tool, a plurality of said transmitter antennas being arranged with their magnetic moments at an angle with respect to the tool axis and oriented in different directions from one another;

(b) measuring a set of voltages induced in a set of receiver antennas disposed on the induction tool, the voltages being induced by eddy currents that result from said electromagnetic fields, a plurality of said receiver antennas being arranged with their axes at an angle with respect to the tool axis and oriented in different directions from one another, wherein each of the set of voltages measure a coupling between a transmitter antenna of the set of transmitter antennas and a receiver antenna of the set of receiver antennas; and (c) determining the presence of the fracture based on the measured voltages.

2. The method of claim 1, wherein step (c) includes comparing magnitudes of the voltages induced in said receiver antennas.

3. The method of claim 1, wherein step (b) includes taking measurements at a plurality of azimuthal angles.

4. The method of claim 3, wherein step (c) includes comparing magnitudes of the voltages induced in said receiver antennas at the plurality of azimuthal angles.

5. The method of claim 3, further comprising:

(d) determining an orientation of the fracture based on the measurements at the plurality of azimuthal angles.

6. The method of claim 5, wherein step (d) includes constructing a chart representing the measured voltages as a function of the plurality of the azimuthal angles.

7. The method of claim 5, wherein step (d) includes determining an angle θ according to:

$$\theta = \frac{1}{2} \tan^{-1} (2V_{xy}/(V_{yy}-V_{xx}))$$

wherein θ being an angle of the fracture with respect to a X-coordinate direction, $V_{xy}$ being a voltage induced in a receiver orientated in a Y-coordinate direction by a transmitter orientated in an X-coordinate direction, $V_{xx}$ being a voltage induced in a receiver orientated in the X-coordinate direction by a transmitter orientated in the X-coordinate direction, and $V_{yy}$ being a voltage induced in a receiver orientated in the Y-coordinate direction by a transmitter orientated in the Y-coordinate direction.

8. The method of claim 1, wherein the set of transmitter antennas comprises two antennas with their magnetic moments at right angles with respect to the longitudinal tool axis, and the set of receiver antennas comprises two antennas with their axes at right angles with respect to the longitudinal tool axis.

9. The method of claim 8, wherein step (b) includes taking measurements at one azimuth.

10. The method of claim 1, wherein the set of transmitter antennas consists of triaxial antennas and the set of receiver antennas consists of triaxial antennas.

11. The method of claim 10, wherein step (b) includes taking measurements at one azimuth.

12. The method of claim 1, wherein steps (a) and (b) are repeated at a plurality of axial depths along a borehole that penetrates said earth formation.

13. A system for locating a subsurface fracture in an earth formation, comprising:

an induction tool having a longitudinal axis and adapted for disposal within a borehole traversing the formation;

a set of transmitter antennas disposed on the tool, a plurality of said antennas arranged with their magnetic moments at an angle with respect to the tool axis and oriented in different directions from one another;

a set of receiver antenna disposed on the tool and adapted to detect eddy currents induced by said transmitter antennas, a plurality of said receiver antennas arranged with their axes at an angle with respect to the tool axis and oriented in different directions from one another;

a power source to energize the met of transmitter antennas;

processing means to determine a set of voltages induced in the set of receiver antennas, wherein each of the set of voltages measure a coupling between a transmitter antenna of the set of transmitter antennas and a receiver antenna of the set of receiver antennas; and processing means to locate a fracture from the voltages induced in said receiver antennas.

14. The system of claim 13, further comprising processing means to determine an orientation of the fracture.

15. The system of claim 13, wherein the processing means to determine the induced voltages comprises means to determine said voltages at a plurality of azimuthal angles.

16. The system of claim 14, wherein the processing means to determine the orientation of the fracture comprises means to calculate an angle θ according to:

$$\theta = \frac{1}{2} \tan^{-1} (2 V_{xy}/(V_{yy}-V_{xx}))$$

wherein θ being an angle of the fracture with respect to a C-coordinate direction, $V_{xy}$ being a voltage induced in a receiver orientated in a Y-coordinate direction by a transmitter orientated in an X-coordinate direction, $V_{xx}$ being a voltage induced in a receiver orientated in the X-coordinate direction by a transmitter orientated in the X-coordinate direction, and $V_{yy}$ being a voltage induced in a receiver orientated in the Y-coordinate direction by a transmitter orientated in the Y-coordinate direction.

17. The system of claim 13, wherein at least two of said transmitter antennas are disposed on the tool with their magnetic moments at right angles with respect to the longitudinal tool axis.

18. The system of claim 17, wherein at least two of said receiver antennas are disposed on the tool with their axes at right angles with respect to the longitudinal tool axis.

19. The system of claim 18, wherein the processing means to determine the induced voltages comprises means to determine said voltages at one azimuth.

20. The system of claim 13, wherein the set of transmitter antennas consists of triaxial antennas and the set of receiver antennas consists of triaxial antennas.

21. The system of claim 20, wherein the processing means to determine the induced voltages comprises means to determine said voltages at one azimuth.

22. The system of claim 13, wherein the induction tool is adapted for disposal within the borehole while drilling said borehole.

23. The system of claim 13, wherein the induction tool is adapted for disposal within said borehole on a wireline.

24. A method for locating a fracture in an earth formation penetrated by a borehole, comprising:
(a) moving an induction tool in the borehole, the induction tool having a longitudinal axis end comprising a plurality of transmitter antennas adapted to induce mutually orthogonal magnetic moments and a plurality of receiver antennas having mutually orthogonal axes;
(b) inducing magnetic fields using the plurality of transmitter antennas;
(c) measuring a set of voltages induced in the plurality of receiver antennas, wherein each of the set of voltages measure a coupling between a transmitter antenna of the plurality of transmitter antennas and a receiver antenna of the plurality of receiver antennas; and
(d) locating the fracture from the voltages induced in the plurality of receiver antennas.

25. The method of claim 24, further comprising:
(e) determining an orientation of the fracture from the voltages induced in the plurality of receiver antennas.

26. The method of claim 25, wherein step (e) comprises calculating an angle $\theta$ according to:

$$\theta = \tfrac{1}{2} \tan^{-1}(2V_{xy}/(V_{yy}-V_{xx}))$$

wherein $\theta$ being an angle of the fracture with respect to a X-coordinate direction, $V_{xy}$ being a voltage induced in a receiver orientated in a Y-coordinate direction by a transmitter orientated in an X-coordinate direction, $V_{xx}$ being a voltage induced in a receiver orientated in the X-coordinate direction by a transmitter orientated in the X-coordinate direction, and $V_{yy}$ being a voltage induced in a receiver orientated in the Y-coordinate direction by a transmitter orientated in the Y-coordinate direction.

27. The method of claim 24, wherein said plurality of transmitter antennas consists of a triaxial set of antennas and said plurality of receiver antennas consists of a triaxial set of antennas.

28. The method of claim 27, wherein step (c) comprises measuring the induced voltages at one azimuth.

29. The method of claim 24, wherein the induction tool comprises two transmitter antennas with their magnetic moments at right angles with respect to the longitudinal tool axis, and two receiver antennas with their axes at right angles with respect to the longitudinal, tool axis.

30. The method of claim 29, wherein step (c) comprises measuring the induced voltages at one azimuth.

31. The method of claim 24, wherein the magnetic moments of said transmitter antennas are substantially parallel with the axes of said receiver antennas.

* * * * *

UNITED STATES PATENT AND TRADEMARK OFFICE
CERTIFICATE OF CORRECTION

PATENT NO. : 6,937,021 B2
DATED : August 30, 2005
INVENTOR(S) : Richard A. Rosthal It is certified that error appears in the above-identified patent and that said Letters Patent is hereby corrected as shown below:

<u>Title page, Item [54] and Column 1, line 3,</u>
Title, change "FRACTION" to -- FRACTURE --.

Signed and Sealed this

Sixth Day of December, 2005

JON W. DUDAS
*Director of the United States Patent and Trademark Office*